(12) United States Patent
Granstrom et al.

(10) Patent No.: US 6,667,860 B1
(45) Date of Patent: Dec. 23, 2003

(54) INTEGRATED, ON-BOARD DEVICE AND METHOD FOR THE PROTECTION OF MAGNETORESISTIVE HEADS FROM ELECTROSTATIC DISCHARGE

(75) Inventors: Eric Leroy Granstrom, Golden Valley, MN (US); Ned Tabat, Chanhassen, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/680,661

(22) Filed: Oct. 5, 2000

Related U.S. Application Data
(60) Provisional application No. 60/157,898, filed on Oct. 5, 1999.

(51) Int. Cl.$^7$ ................................................. G11B 5/40
(52) U.S. Cl. ......................................................... 360/323
(58) Field of Search ............................... 360/323, 324.1, 360/324.12, 324.11, 128; 257/43, 44, 17; 437/175; 365/185.01

(56) References Cited

U.S. PATENT DOCUMENTS

| | | | | |
|---|---|---|---|---|
| 5,019,530 A | * | 5/1991 | Kleinsasser et al. | ........ 437/175 |
| 5,142,263 A | | 8/1992 | Childers et al. | ............. 338/21 |
| 5,614,727 A | | 3/1997 | Mauri et al. | .................. 257/43 |
| 5,677,867 A | * | 10/1997 | Hazani | .................. 365/185.01 |
| 5,710,682 A | | 1/1998 | Arya et al. | ................. 360/106 |
| 5,719,647 A | | 2/1998 | Fujikawa et al. | ............. 349/40 |
| 5,748,412 A | | 5/1998 | Murdock et al. | ........... 360/113 |
| 5,751,042 A | | 5/1998 | Yu | ............................. 257/360 |
| 5,757,591 A | | 5/1998 | Carr et al. | .................. 360/113 |
| 5,805,390 A | | 9/1998 | Takeura | ...................... 360/113 |
| 5,807,791 A | | 9/1998 | Bertin et al. | ................. 438/738 |
| 5,812,357 A | | 9/1998 | Johansen et al. | ........... 361/212 |
| 5,828,531 A | * | 10/1998 | Gill | ........................ 360/324.12 |
| 5,877,933 A | | 3/1999 | Johansen et al. | ........... 361/220 |
| 5,903,415 A | | 5/1999 | Gill | .............................. 360/113 |
| 5,918,127 A | | 6/1999 | Lee et al. | .................... 438/278 |
| 5,945,686 A | * | 8/1999 | Fukuda | ......................... 257/17 |
| 6,163,437 A | * | 12/2000 | Inage et al. | ................. 360/128 |
| 6,219,206 B1 | * | 4/2001 | Odai et al. | ................... 360/320 |
| 6,233,127 B1 | * | 5/2001 | Shimazawa | ................. 360/323 |

FOREIGN PATENT DOCUMENTS

| EP | 0 651 372 A1 | | 10/1994 |
|---|---|---|---|
| JP | p2000-306221 A | * | 11/2000 |

OTHER PUBLICATIONS

Webster, Wiley Encyclopedia of Electrical and Elevtronics Engineering, 1998, Jhon Wiley & Sons, Inc. vol. 18, p. 705–710.*

Written Opinion dated Nov. 15, 2001 for PCT/US00/27517.

* cited by examiner

Primary Examiner—Hoa T. Nguyen
Assistant Examiner—Tianjie Chen (57) ABSTRACT

This invention discloses a circuit including a magnetoresistive sensor and a tunnel junction device coupled to the MR sensor to dissipate the energy associated with an electrical signal exceeding operational voltages for the sensor. The tunnel junction can include a first conducting layer, a second conducting layer, and a barrier material positioned between the first and the second conducting layer. The barrier material can be positioned so that the first conducting layer and the second conducting layer do not make contact. The MR sensor can be connected in parallel to the first and second conducting layer. The tunnel junction can be made of a material with a resistance more than the MR sensor's resistance at operational voltages and a resistance below the MR sensor's resistance at larger voltages. In another aspect of the invention, a method for fabricating the protected circuit including integrating a MR sensor on the circuit and coupling a tunnel junction to the MR sensor to dissipate an electrical signal exceeding operational voltages for the MR sensor is presented. The tunnel junction device can be fabricated during the fabrication of the circuit. The method can include fabricating the tunnel junction on the MR sensor.

18 Claims, 6 Drawing Sheets

INTEGRATED, ON-BOARD DEVICE AND METHOD FOR THE PROTECTION OF MAGNETORESISTIVE HEADS FROM ELECTROSTATIC DISCHARGE

CROSS REFERENCE TO RELATED APPLICATION(S)

This application claims priority from provisional application number 60/157,898, filed Oct. 5, 1999 for "Integrated On Board ESD Protection of MR Heads" by Eric L. Granstrom and Ned Tabat.

BACKGROUND

The following invention relates to the protection of magnetoresistive ("MR") sensor from electrostatic discharge ("ESD") or electrical overstress ("EOS"). Electrostatic charge may accumulate as a result of friction or movement. An ESD event can occur when an object carrying such an accumulation of electrostatic charge contacts an electrically-grounded surface. An ESD event is a transfer of electrostatic charge from an object of greater voltage to an object of lesser voltage. An ESD event often yields a momentary electrical current of significant voltage that is capable of disabling the delicate circuits contained on the MR sensor. Electrostatic discharge events are very common and can be highly destructive to MR sensors. EOS occurs when a MR sensor is subjected to voltages or currents beyond those intended for the MR sensor's operation, typically during events considerably longer in duration than ESD events. An example of EOS is the electrical testing of MR sensors at inappropriate voltages. Similar to ESD, EOS is capable of damaging the MR sensors. Those practiced in the art often refer to "ESD" when referring either to electrostatic discharge or to electrical overstress. The term "ESD" will be used in this patent to refer to both.

The ESD damage to a MR sensor may render the entire device inoperable, in which case protection from ESD is a highly desirable goal. For example, the failure of a MR sensor in a recording head of a hard drive may incapacitate the recording head and cause the hard drive to fail.

MR sensors in modem recording heads are susceptible to stray electric charges, fields, and currents. To provide increased areal storage densities, head feature sizes are decreasing, which can exacerbate this problem. Existing MR sensors already display sensitivity to ESD events as small as 1V in magnitude, with that sensitivity slated to steadily increase in the future. Protection from ESD events in MR sensors throughout production, drive assembly, and customer use is therefore a large and growing concern.

Prior art systems exist for protection of integrated circuits from ESD events. For example, conventional diodes may be wired in parallel to a resistive element to offer a shunt for ESD power. These diodes may be configured back-to-back, depending on the level of protection desired, as on-wafer protection in the semiconductor industry. Similar efforts could be made in the MR industry to offer protection to dielectric gaps or to the reader stripe, but the difficulty in processing semiconductors on a MR wafer might render such solutions cost prohibitive.

Prior art systems have several disadvantages. Generally, the prior art systems can be inconvenient, large, late-stage, weak, or single-use. Simply put, the objective of using ESD protection is to lengthen the usable life span of an IC-based component. An ESD protection method that is either too large or inconvenient for the situation will not likely be used. If an ESD protection is late-stage, it may not be implemented in time to protect an IC from ESD events during manufacture and assembly. Also, ESD protection that is weak may not be effective against strong ESD events. Single-use ESD protection only protects the IC for one ESD event. Once it is used, no further protection is offered.

Accordingly, it is desirable to provide ESD protection that is convenient, sized appropriately, implemented at an early stage of manufacture, strong, and yet reusable.

SUMMARY OF THE INVENTION

The present invention is directed to a device and a method for the protection of a magnetoresistive ("MR") sensor from electrostatic discharge or electrical overstress The circuit includes a magnetoresistive sensor and a tunnel junction device coupled to the MR sensor to dissipate the energy associated with an electrical signal exceeding operational voltages for the sensor. The tunnel junction can include a first conducting layer, a second conducting layer, and a barrier material positioned between the first and the second conducting layer. The barrier material can be positioned so that the first conducting layer and the second conducting layer do not make contact.

The MR sensor can be connected in parallel to the first and second conducting layer. The tunnel junction can be made of a material with a resistance more than the MR sensor's resistance at operational voltages and a resistance below the MR sensor's resistance at larger voltages.

The protected circuit can include a magnetoresistive sensor with resistance of approximately 70Ω. The operational voltage range of the sensor can include a range of approximately 0.2V±0.1V, operating at up to approximately 1 GHz. The tunnel junction further comprises a capacitance of approximately 1 pF and a resistance of greater than 1 kΩ at the operational voltages of the MR sensor and 1Ω at the higher voltages.

The first conducting layer can include a first metal layer, the second conducting layer can include a second metal layer, and the barrier material can include an insulating material. The barrier material can include an area of approximately 30 $\mu m^2$ a thickness of approximately 35 Å, an energetic barrier for electrons of approximately 0.35 eV between its conduction band and Fermi level, and a capacitance of approximately 1 pF. The barrier material can include a thin film barrier material.

The tunnel junction further can include an insulating barrier made of one or more materials, such as $SiN_x$, $SiO_x$, $CaF_2$, $Al_2O_3$, and AlN. The junction can include an insulating barrier material made of one or more semiconductive materials, such as Si, amorphous Si, poly-Si, Ge, SiGe, GaAs, GaAlAs, ZnSe, ZnS, CdSe, and CdS.

The tunnel junction can exhibit a process, such as tunneling of electrons, thermionic emission, and thermionic field emission, to achieve a super-linear dependence of current on voltage during the change of state of the tunnel junction when the MR sensor is at the conventional voltages and when the MR sensor is at the larger voltages. The tunnel junction can be coupled to the MR sensor during fabrication of the circuit.

In another aspect of the invention, a method for fabricating the protected circuit including integrating a MR sensor on the circuit and coupling a tunnel junction to the MR sensor to dissipate an electrical signal exceeding operational voltages for the MR sensor is presented. The tunnel junction device can be fabricated during the fabrication of the circuit. The method can include fabricating the tunnel junction on the MR sensor.

The invention accordingly includes the features of construction, combination of elements and arrangement of parts that will be exemplified in the following detailed disclosure, and the scope of the invention will be indicated in the claims. Other features and advantages of the invention will be apparent from the description, the drawings, and the claims. This invention can include one or more of the following advantages:

The ESD protection device can be capable of withstanding multiple, high-voltage ESD events throughout the lifecycle of the integrated circuit. The shunting of current through the ESD protection device can leave both the ESD protection device and the MR sensor undamaged, meaning repeated exposures to ESD level voltages can be tolerated, with the subsequent product repeatedly returning to completely operational conditions. The energy levels a MR sensor can withstand with the ESD protection device can be greater than twenty times its unprotected levels.

The ESD protection device can be fabricated with the MR sensor during wafer-level processing. This can ensure that the MR sensor is protected during fabrication of the integrated circuit, through packaging, and throughout the lifecycle of the integrated circuit.

The ESD protection device disclosed may not require highly-pure, highly-crystalline semiconductor materials.

DETAILED DESCRIPTION

Figure 1A:
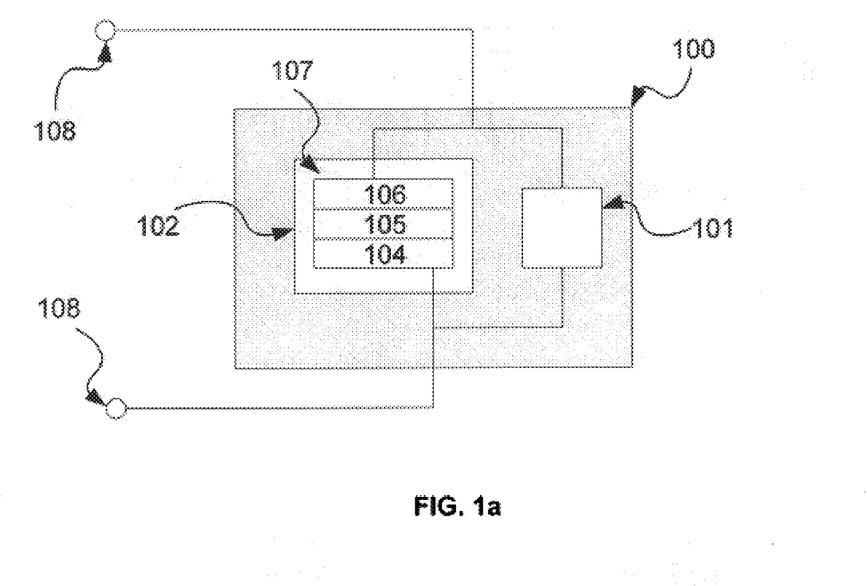
FIG. 1a illustrates a tunnel junction ESD protection device connected by parallel circuitry to a MR sensor.

Referring first to FIG. 1a, a tunnel junction electrical overcharge ("ESD") protection device is connected by parallel circuitry to a MR sensor. Integrated on-board a circuit 100 are the MR sensor 101 and the tunnel junction device 102. Because electrical current follows the path of least resistance, current flowing through the parallel circuitry will distribute itself according to the resistances of the parallel paths. In general, current will flow between the input terminals 108 either through the MR sensor 101 or through the tunnel junction device 102.

Figure 1B:
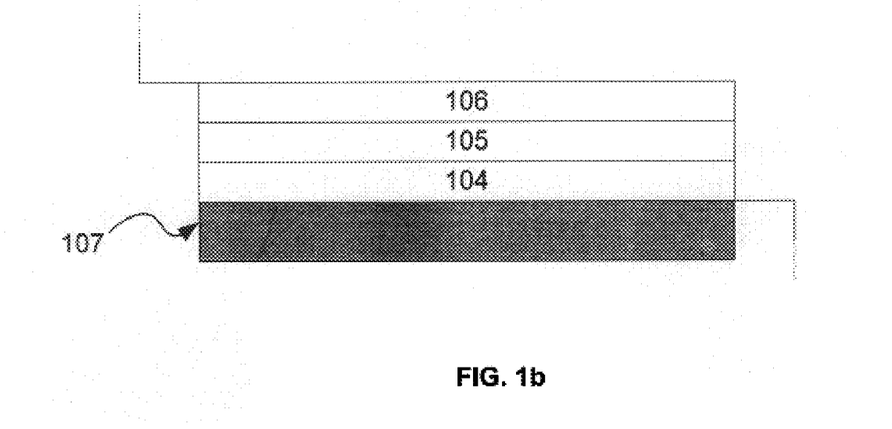
FIG. 1b illustrates a cross-sectional view of the tunnel junction device.

FIG. 1b shows a cross-sectional view of the tunnel junction device. The tunnel junction device 102 comprises a multilayer thin film, which includes a first conducting layer 104, a second conducting layer 106, and a thin film barrier material 105. The thin film barrier material 105 is positioned between the first conducting layer 104 and the second conducting layer 106 so that the first conducting layer 104 and second conducting layer 106 do not make contact. The two confining conducting layers are connected by associated parallel circuitry to form a path in parallel to the MR sensor. A metal can be used in the first and second conducting layers 104 and 106. The tunnel junction device 102 can be positioned on the substrate 100 or in any part of a circuit equivalently connected to the MR sensor 101.

ESD protection is achieved through the parallel connection of the tunnel junction device 102 and the MR sensor 101. The non-linear current-voltage characteristics of the tunnel junction device 102 result in two distinct operational states, an off-state and an on-state. During an ESD event, the tunnel junction 102 is configured to momentarily transition between the off-state and the on-state to protect the MR sensor 101.

The off-state is a state of high electrical resistance relative to that of the MR sensor 101 at voltages within an operational voltage range of the MR sensor 101. The on-state is a state of low electrical resistance relative to that of the MR sensor 101 at voltages above the operational voltage range of the MR sensor 101. At low voltages, the tunnel junction device 102 is in the off-state, and current flows through the MR sensor 101. Negligible current passes though the tunnel junction device 102, leaving the sensor operationally unchanged. At high voltages, the tunnel junction device 102 enters the on-state, and its much decreased resistance allows current associated with an ESD event to flow and be dissipated in part through the tunnel junction device 102. The shunting of the current through the tunnel junction device 102 leaves both it and the MR sensor 101 undamaged. Therefore, repeated exposures to ESD level voltages can be tolerated with the MR sensor 101 returning to operational conditions.

The constituent materials, dimensions, and processing steps are chosen to achieve appropriate electrical and thermal properties. The material between conducting layers 104 and 106 is a material with a low density of electronic states near its Fermi level (i.e., its chemical potential).

In another embodiment of this invention, the tunnel junction device 102 can include a metal-insulator-metal ("MIM") tunnel junction device. The MIM tunnel junction device can be fabricated by conventional processes used in MR head fabrication, including among others, thermal evaporation, sputtering, electroplating, and various PVD or CVD thin film deposition techniques. The MIM tunnel junction device 102 can be made by deposition of a thin metal film 104 patterned on a substrate 107, followed by a brief thermal oxidation of the thin metal film 105. This is followed by a subsequent deposition of a patterned metal film 106 on top of the thin metal film 105. FIG. 1b represents the resultant structure of a brief and controlled application of such a thermal oxidation.

Figure 2A:
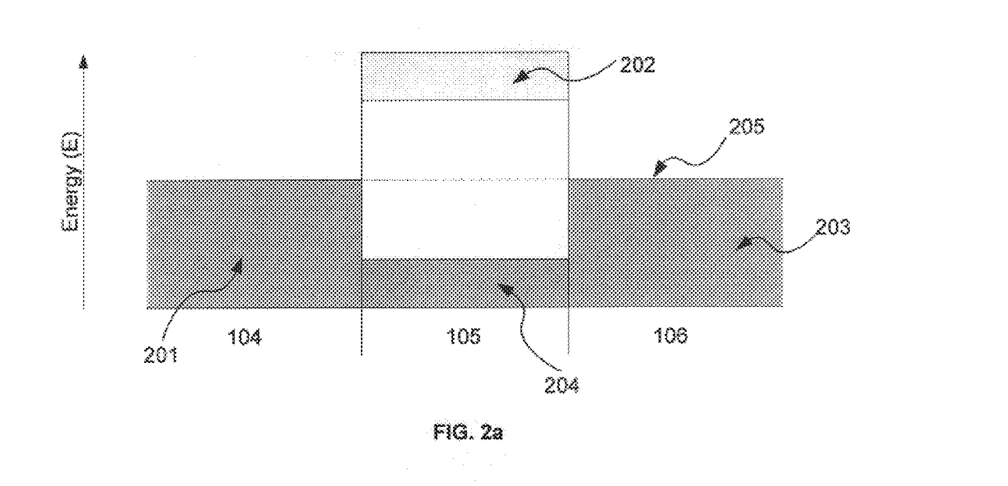
FIG. 2a illustrates a schematic of independent electron energies in the tunnel junction device at or below normal operating voltages.

Referring now to FIG. 2a, a schematic of independent electron energies in the first conducting layer 104, the thin film barrier material 105, the second conducting layer 106, and the Fermi level 205 is presented. The non-linear current-voltage characteristics of the tunnel junction device 102 result from the lack of mobile electrons at equilibrium in the thin film barrier material 105. At low voltages, the highest energy occupied states within 201 and 203 (and the lowest energy unoccupied states 207, which lie directly above 201 and 203) of the conducting layers 104 and 106, respectively, are at higher energies than the occupied states 204 of the barrier material 105, but do not reach the empty conduction band 202 of the barrier material 105. This absence of accessible electron states near the Fermi level 205 in the barrier material 105 generates a high resistance junction. At low voltage, therefore, negligible current flows between the two conducting layers 104 and 106 through the thin film barrier material 105. Most current, therefore, flows through the MR sensor 101.

FIGS. 2b–2g show schematics of independent electron energies in the first conducting layer 104, the thin film barrier material 105, and the second conducting layer 106 of a tunnel junction device 102 during an ESD event. At high voltages, the occupied states 201 of the first conducting layer 104 generally rise to permit the tunneling of electrons 208 through unoccupied electron states 202 of the thin film barrier material 105 to the unoccupied states 207 of the second conducting layer 106. Although this example shows an ESD event occurring in the first conducting layer 104, the same result would occur if an ESD event occurred in the second conducting layer 106.

The current 208 moving through the tunnel junction device 102 is highly non-linear in nature and can be used with thin film barriers 105 to generate useful device performance. The non-linearity stems from a variety of sources in different contexts and modes of operation.

While these descriptions will be discussed in terms of electrons, similar statements can be made for holes. Direct quantum mechanical tunneling of electrons from the first conducting layer 104 to the second conducting layer 106 through the thin film barrier material 105 can occur without the electrons entering the conduction (valence) band 204 of the intervening thin film barrier material 105. Instead, electrons can enter the empty conduction band 202 to pass through to the second conducting layer 106.

Figure 2B:
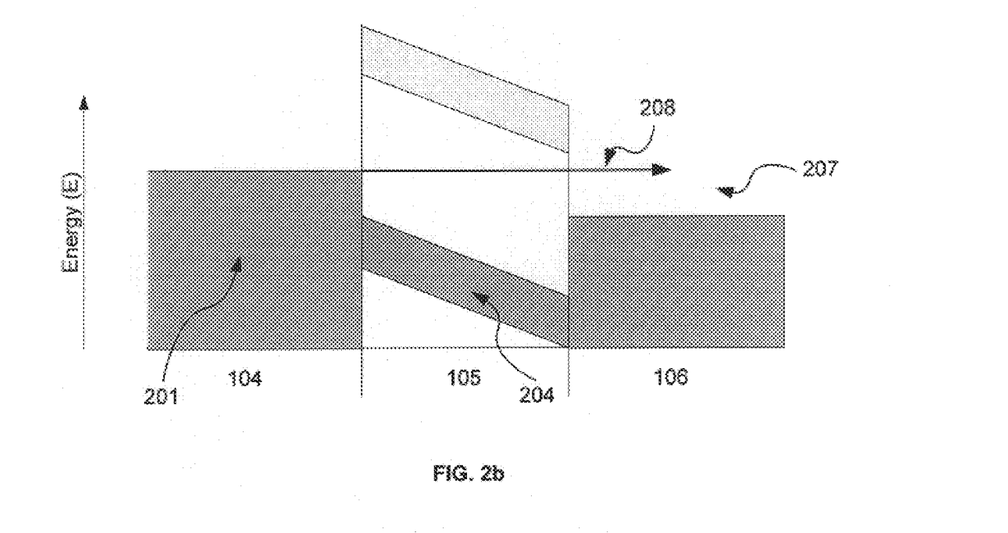
FIGS. 2b–g illustrates a schematic of independent electron energies in the tunnel junction device at higher voltages.
Figure 2C:
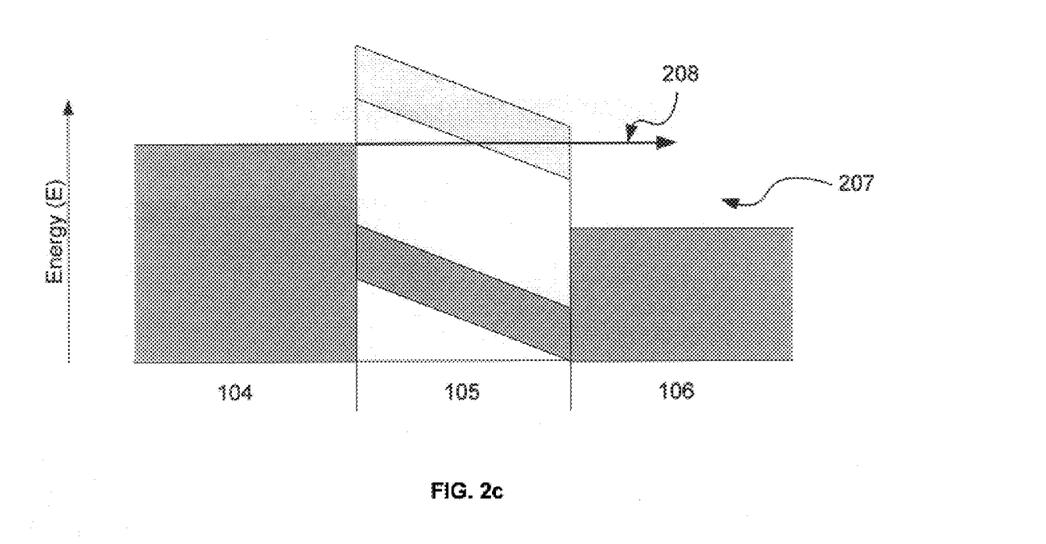
Figure 2D:
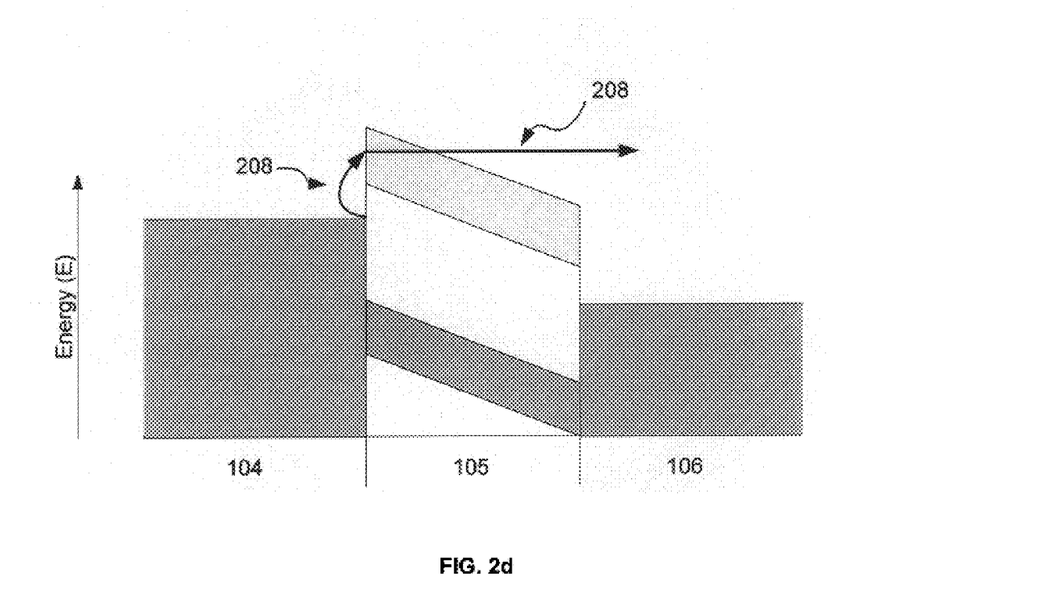
Figure 2E:
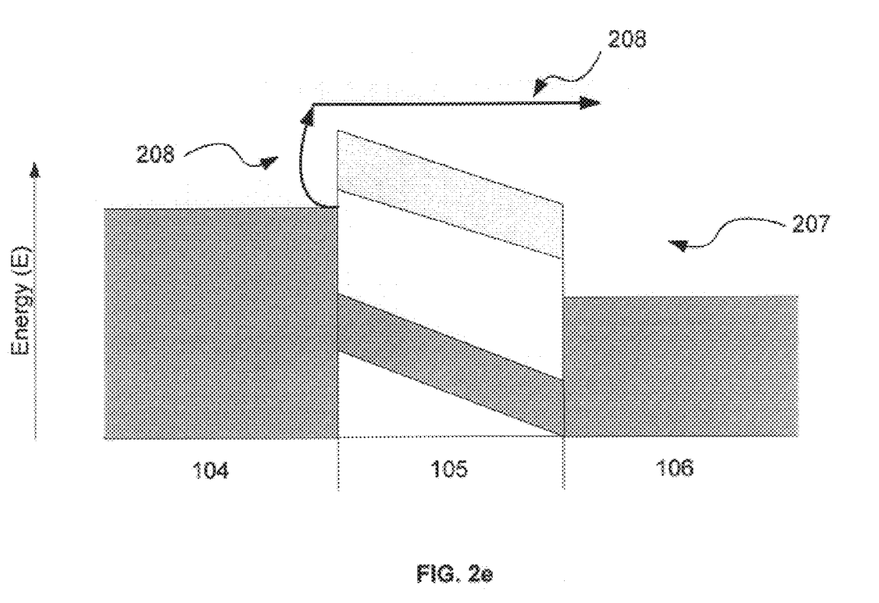

The tunnel junction 102 can exhibit varying mechanisms for electron transport to achieve a super-linear dependence of current on voltage during the transition of the tunnel junction 102 when the MR sensor 101 operates at operational voltages and when the MR sensor 101 operates at larger voltages. Various fundamental models known to those skilled in the art can describe this tunneling. For example, direct tunneling, as is shown in FIG. 2b, may dominate at low device voltages. Field emission, as is shown in FIG. 2c, will become more important at higher voltages, where the conduction band 202 of the barrier becomes accessible to injection filled states 201. Depending upon barrier height and device operating temperature, thermionic emission, as shown in FIG. 2e, may play a large role. Thermionic field emission, as shown in FIG. 2d, occurs when charge is thermally excited in an electrode to a level insufficient to allow direct transport into the barrier material, but allows transport by subsequent tunneling into the conduction band of the barrier material 202. A model of Schottky emission is also used to indicate that the independent electron energy level diagrams need be modified slightly to account for electrostatic image charge effects.

These models generally describe direct tunneling as generating a current that increases with either the square or cube of the applied voltage, or increases exponentially with the applied voltage. At higher voltages, the conduction (valence) band 205 will be accessible to tunneling, and a different functional form (i.e., Fowler-Nordheim tunneling) is exhibited, generally described by a strong exponential dependence of current on voltage. This super-linear dependence of current described by either model is the basis for the off-state to on-state transition in the tunnel junction device 102 that allows for ESD protection.

Figure 2F:
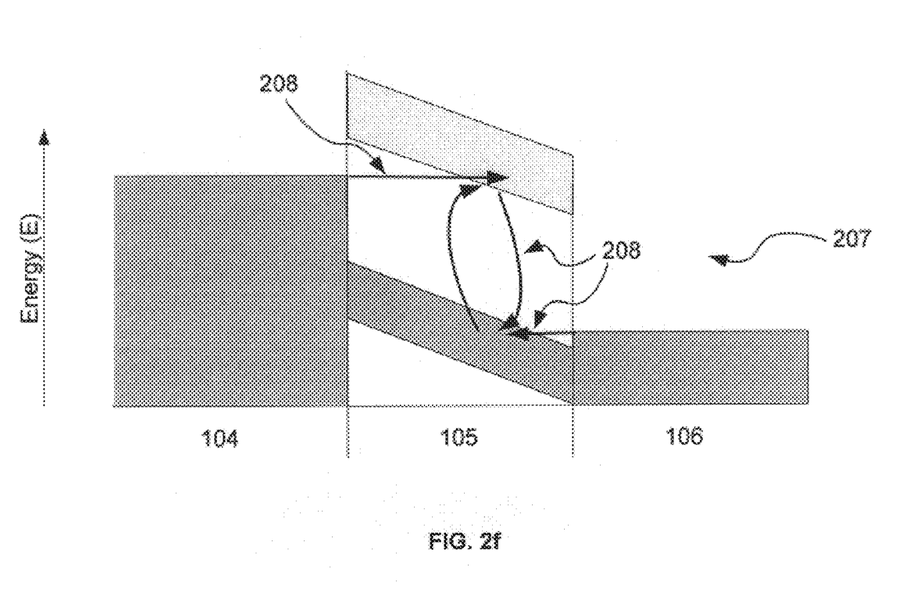
Figure 2G:
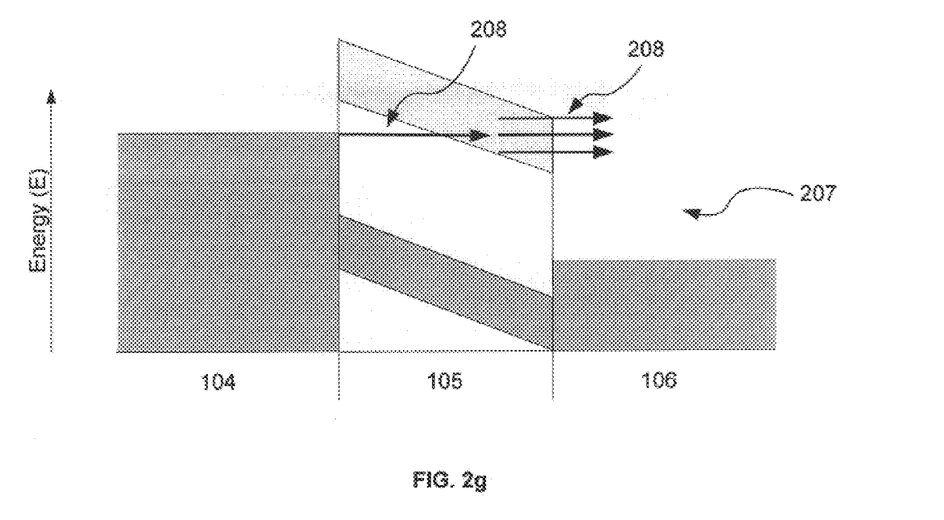

Referring to FIG. 2b, under direct current bias, direct tunneling 208 can have strong non-linearity at higher voltages. In FIG. 2c, tunneling 208 into a band 205 in thin film barrier material 105 has similar effects, and under appropriate conditions, it can offer stronger non-linearity (i.e., Fowler-Nordheim tunneling). FIGS. 2d–2e depict variations of thermally-assisted transfer of electrons 208, having similar characteristics. Referring to FIG. 2f, current 208 carrier recombination within the insulating barrier 105 can also be used to provide non-linearity. Referring to FIG. 2g, current 208 transfer resulting in impact ionization within either the insulating barrier 105 or the unoccupied states of the second conductor 207 may also be used to generate non-linearity. The result of any of these or many other processes in a tunnel junction device can be a useful drop in resistance at high device voltages.

Figure 3:
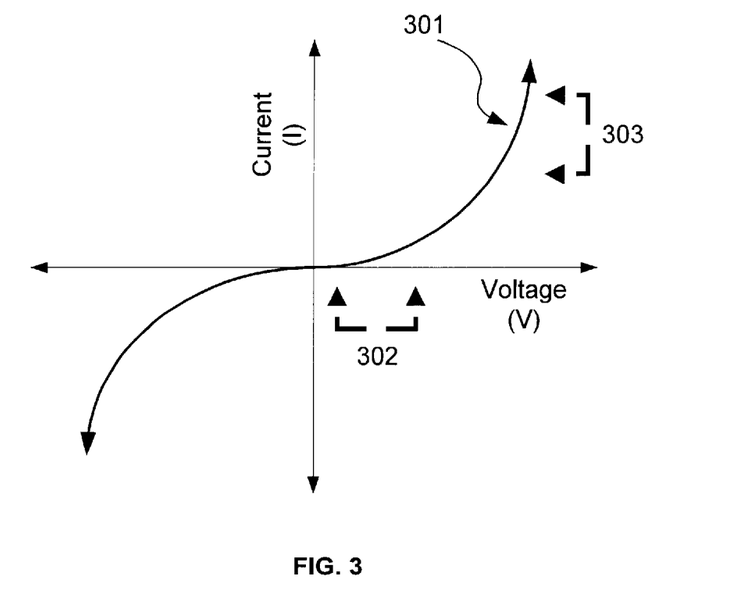
FIG. 3 illustrates a graphical representation of the current-voltage (I-V) relationship of the tunnel junction device.

Referring now to FIG. 3, a current-voltage (I-V) relationship 301 of a tunnel junction device 102 is graphed. The current-voltage (I-V) characteristics of this device require strong non-linearity (i.e., non-Ohmic behavior), showing a transition from a high-resistance state at low voltages 302 to a low-resistance state at high voltages 303. The basic fundamental requirement for tunnel junction ESD protection is that the tunnel junction 102 needs a resistance far in excess of that of the MR sensor at conventional voltages, and a resistance far below that of the MR sensor at larger ESD transient voltages.

For example, if the device to be protected at 1V or greater is a 70 Ω sensor operated at 0.2V, a transition from a 1000Ω off-state at 0.2V to a 1Ω on-state at 1V can be used to protect the MR sensor from ESD. In one embodiment, this desired transition is achieved if the tunnel junction device 102 has a thin film barrier 105 with a thickness of 35 Å providing a 0.35 eV barrier between its conduction (valence) band and Fermi level. Various insulators, such as $SiN_x$, $SiO_x$, $CaF_2$, $Al_2O_3$, and AlN, can be used to achieve this. Semiconductors that are readily processed during MR production are also possibilities, such as Si, amorphous Si, poly-Si, Ge, SiGe. Other conventional semiconductors are also possibilities, such as GaAs, GaAlAs, ZnSe, ZnS, CdSe, CdS. Semiconductors might offer the additional advantage of being capable of moving charge through conduction (valence) bands more effectively than insulators. Simple modeling calculations on a 35 Å, 0.35 eV barrier in a tunnel junction device 102 having an area of 30 $\mu m^2$ (limited by capacitance, as discussed below) shows a transition from 1 MΩ to 0.5Ω, within the design limitation of a 1 kΩ-to-1Ω transition.

Figure 4:
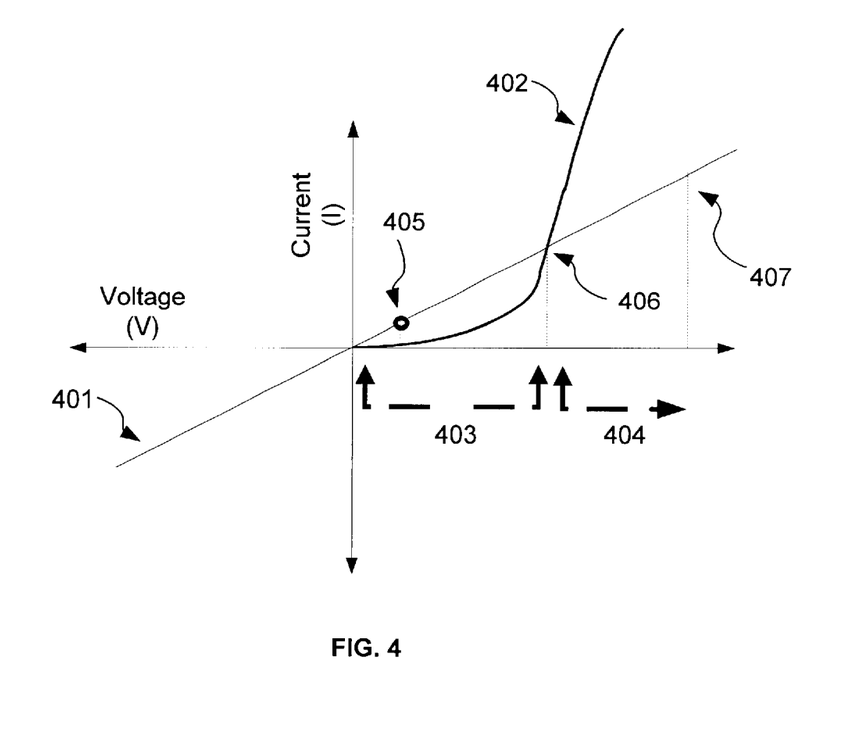
FIG. 4 illustrates a graphical representation of the current-voltage (I-V) relationship of a MR head in comparison to the current-voltage (I-V) relationship of the tunnel junction device.

Referring now to FIG. 4, a current-voltage (I-V) relationship 401 of a MR head sensor 101 is graphed in comparison to the current-voltage (I-V) relationship 402 of an MIM tunnel junction device 102. The mostly-linear relationship 401 of the MR head sensor 101 intersects 406 the non-linear relationship of the MIM tunnel junction device 402 above the operating voltage 405 of the MR head sensor 101, but well below the ESD voltages 407 that are dangerous to the MR head sensor 101. At low voltages 403 below the intersection 406 of the MR head sensor 101 and the MIM tunnel junction device 102, current primarily flows though the MR head sensor 101. At high voltages 404 above this intersection 406, current primarily flows through the MIM tunnel junction device 102.

The MIM tunnel junction device 102 requires a capacitance that must not attenuate the rapidly varying signals passing through the device it is designed to protect. As an example of this, assume the MIM tunnel junction device 102 is wired in parallel to the MR sensor 102, which is operating at up to approximately 1 GHz, 200 mV, and 70Ω. The capacitance associated with the MIM tunnel junction device 102 will act in conjunction with the 70Ω sensor resistance as a filter and could attenuate these signals. To prevent the MIM tunnel junction device 102 from limiting MR sensor speed, the MIM tunnel junction device 102 capacitance must not exceed approximately 1 pF, given the frequency of about 1 GHz. Because capacitance is proportional to the dimensions of the MIM tunnel junction 102, the area and depth ("d") of the thin film barrier material 105 of the MIM tunnel junction 102 should be chosen to yield the desired resistances (i.e., $R_{MIM}$=1 kΩ at 200 mV and 1Ω at 1V) given the limitation in capacitance (i.e., $C_{MIM}$≈1 pF). Since functional dependence of $R_{MIM}$ on d is exponential, but dependence of $C_{MIM}$ on 1/d is linear, d is selected to achieve the design limitations of $R_{MIM}$ and $C_{MIM}$. A tunnel junction device 102 limited in cross-sectional area and thickness so as not to have a capacitance greater than 1 pF will limit signal attenuation to approximately 0.2 dB (i.e., 2% of input current is non-modulated by changing magnetic fields due to its storage in MIM capacitor).

The MIM tunnel junction device 102 should be capable of dissipating the I-V power of the ESD event without the breakdown of the MIM tunnel junction device 102, and without a capacitance that limits the MR head sensor speed. The breakdown of the MIM tunnel junction device 102 under ESD stress is a primary concern for practical use. At 1V, the current density flowing through the tunnel junction is approximately $3.3 \times 10^5$ A/cm$^2$, an enormous current stress. Many theoretical models describing the failure mechanism in MR stacks rely upon an assumption of adiabatic heat generation in the MR stack material, which creates enough of a rise in temperature to either melt the biased layers or the MR stack itself, or, in combination with the magnetic field associated with an ESD current, induce depinning in the sensor stack. The nanosecond time scales of the ESD event justify the adiabatic approximation because negligible heat can be lost to the surrounding environment in that short duration. A similar failure is possible in the MIM tunnel junction structure itself. The energy required to melt the thin film barrier material, however, will be approximately 20 times larger, due to its increased volume. If the ESD source acts as a charge source, and failure is assumed in the MIM to occur at the same temperature as it would have occurred in the MR sensor, this allows for a 4.4 times larger energy ESD event to be dissipated (energy scales as ½ $CV^2$). If the ESD source acts as a voltage source, this allows for a 20 times larger energy ESD event to be dissipated. Due to its geometry, heat dissipation may also be present in the MIM device even if not in the MR stack during ESD allowing further ESD protection. These levels of protection can be optimized with respect to device parameters, such as barrier energy, thickness, and area.

A number of embodiments of the present invention have been described. Nevertheless, it will be understood that various modifications may be made without departing from the spirit and scope of the invention. Accordingly, other embodiments are within the scope of the following claims.

What is claimed is:

1. A circuit comprising:

a magnetoresistive sensor; and a bidirectional tunnel junction coupled to the sensor, wherein the tunnel junction changes states to dissipate energy associated with an electrical signal having a magnitude exceeding operational voltages for the sensor; and the tunnel junction comprising a first conducting layer, a barrier material having a low density of electronic states near its Fermi level, and a second conducting layer arranged to form a bidirectional tunnel junction across the barrier.

2. The circuit as in claim 1, wherein the tunnel junction comprises:

the barrier material positioned between the first conducting layer and the second conducting layer, wherein the barrier material is positioned so that the first conducting layer and the second conducting layer do not make contact.

3. The circuit as in claim 2, wherein the sensor is connected in parallel to the first conducting layer and the second conducting layer.

4. The circuit as in claim 2, wherein the barrier material further comprises an area of approximately 30 $\mu m^2$, a thickness of approximately 35 Å, an energetic barrier for electrons of approximately 0.35 eV between its conduction band and Fermi level, and a capacitance of approximately 1 pF.

5. The circuit as in claim 2, wherein the barrier material further comprises a semiconductive material selected from the group consisting of Si, amorphous Si, poly-Si, Ge, SiGe, GaAs, GaAlAs, ZnSe, ZnS, CdSe, and CdS.

6. The circuit as in claim 1, wherein the tunnel junction comprises:

a tunnel junction with a resistance in excess of the sensor's resistance at the operational voltages and a resistance below the sensor's resistance at larger voltages, which is larger than the operational voltages.

7. The circuit as in claim 6, wherein the tunnel junction further exhibits a process selected from the group consisting of tunneling of electrons, thermionic emission, and thermionic field emission, to achieve a super-linear dependence of current on voltage during the change of states for the tunnel junction when the sensor is at the operational voltages and when the sensor is at the larger voltages.

8. The circuit as in claim 1, wherein the first conducting layer comprises a first metal layer, the second conducting layer comprises a second metal layer, and the barrier material comprises a material, which is insulting at operational voltages.

9. The circuit as in claim 1, wherein the barrier material further comprises an insulating material selected from the group consisting of $SiN_x$, $SiO_2$, $CaF_2$, $Al2O_3$, and AlN.

10. The circuit as in claim 1, wherein the tunnel junction is coupled to the sensor during fabrication of the circuit.

11. A circuit comprising:

a magnetoresistive sensor; and a tunnel junction coupled to the sensor, wherein the tunnel junction changes states to dissipate energy associated with an electrical signal exceeding operational voltages for the sensor; and wherein the tunnel junction additionally comprises:

a material having a low density of electronic states near its Fermi level with a resistance in excess of the sensor's resistance at the operational voltages and a resistance below the sensor's resistance at larger voltages, which is larger than the operational voltages;

the sensor comprises a resistance of approximately 70 ω;

the operational voltages of the sensor further comprises a range of approximately 0.2 V±0.1 V, operating at up to approximately 1 GHz; and the tunnel junction further comprises a capacitance of approximately 1 pF and a resistance of greater that 1 kω at the operational voltages of the sensor and 1 ω at the larger voltages.

12. A method of fabricating a circuit comprising the steps of:
  integrating a magnetoresistive sensor on the circuit; and
  coupling a bidirectional tunnel junction to the sensor, wherein the tunnel junction changes states to dissipate an electrical signal exceeding operational voltages for the sensor; and
  the tunnel junction comprising a first conducting layer, a barrier material having a low density of electronic states near its Fermi level, and a second conducting layer arranged to form a bidirectional tunnel junction across the barrier.

13. The circuit as in claim 1, wherein the tunnel junction further comprises:
  the barrier material positioned between the first conducting layer and the second conducting layer, wherein the barrier material is positioned so that the first conducting layer and the second conducting layer do not make contact.

14. The method of claim 13, wherein the first conducting layer comprises a first metal layer, the second conducting layer comprises a second metal layer, and the barrier material comprises a material, which is insulting at operational voltages.

15. The method of claim 12, wherein the tunnel junction additionally comprises:
  a material with a resistance in excess of the sensor's resistance at the operational voltages and a resistance below the sensor's resistance at larger voltages, which is larger than the operational voltages.

16. The method of claim 12, further comprising:
  fabricating the tunnel junction during fabrication of the circuit.

17. The method of claim 12, further comprising:
  fabricating the tunnel junction on the sensor.

18. A method of fabricating a circuit comprising the steps of:
  integrating a magnetoresistive sensor on the circuit; and
  coupling a tunnel junction to the sensor, wherein the tunnel junction changes states to dissipate an electrical signal exceeding operational voltages for the sensor;
  wherein the tunnel junction further comprises:
    a first conducting layer;
    a second conducting layer;
    a barrier material having a low density of electronic states near its Fermi level positioned between the first conducting layer and the second conducting layer, wherein the barrier material is positioned so that the first conducting layer and the second conducting layer do not make contact and is comprised of a material with a resistance in excess of the sensor's resistance at the operational voltages and a resistance below the sensor's resistance at larger voltages, which is larger than the operational voltages;
  wherein the sensor further comprises a resistance of approximately 70Ω;
    the operational voltages of the sensor further comprise a range of approximately 0.2V±0.1V, operating at up to approximately 1 GHz; and
    the tunnel junction further comprises a capacitance of approximately 1 pF and a resistance of greater than 1 kΩ at the operational voltages and 1Ω at the larger voltages.

* * * * *